United States Patent
Patel et al.

(10) Patent No.: US 10,252,689 B2
(45) Date of Patent: Apr. 9, 2019

(54) KNEE AIRBAG WITH RECEIVING POCKETS

(71) Applicant: Ford Global Technologies, LLC, Dearborn, MI (US)

(72) Inventors: Deepak Patel, Canton, MI (US); Kris Allyn Warmann, Dearborn, MI (US); Edward Joseph Abramoski, Canton, MI (US); Zhibing Deng, Northville, MI (US); Morteza Tanbakuchi, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/665,621

(22) Filed: Aug. 1, 2017

(65) Prior Publication Data

US 2019/0039551 A1 Feb. 7, 2019

(51) Int. Cl.
*B60R 21/16* (2006.01)
*B60R 21/206* (2011.01)
*B60R 21/231* (2011.01)

(52) U.S. Cl.
CPC .......... *B60R 21/206* (2013.01); *B60R 21/231* (2013.01); *B60R 2021/23169* (2013.01)

(58) Field of Classification Search
CPC . B60R 21/2338; B60R 21/206; B60R 21/239; B60R 2021/23386; B60R 2021/2395; B60R 2021/23169
USPC ................ 280/728.2, 730.1, 730.2, 752, 753
See application file for complete search history.

(56) References Cited

U.S. PATENT DOCUMENTS

| | | | |
|---|---|---|---|
| 6,170,871 B1 * | 1/2001 | Goestenkors | B60R 21/20 280/743.1 |
| 8,215,667 B2 | 7/2012 | Matsushima | |
| 8,267,427 B2 * | 9/2012 | Fukawatase | B60R 21/201 280/743.1 |
| 8,590,928 B2 * | 11/2013 | Spahn | B60R 21/23 280/729 |
| 9,211,860 B2 | 12/2015 | Muraji et al. | |
| 9,272,684 B1 * | 3/2016 | Keyser | B60R 21/237 |
| 9,475,445 B2 | 10/2016 | Jindal et al. | |
| 2008/0106080 A1 * | 5/2008 | Fukawatase | B60R 21/231 280/730.1 |
| 2008/0122205 A1 * | 5/2008 | Imamura | B60R 21/203 280/730.1 |
| 2010/0096841 A1 * | 4/2010 | Tanaka | B60R 21/2032 280/730.1 |

(Continued)

FOREIGN PATENT DOCUMENTS

| | | |
|---|---|---|
| DE | 102008029655 A1 | 12/2009 |
| JP | 2012121572 A | 6/2012 |
| JP | 201585761 A | 5/2015 |

*Primary Examiner* — Toan C To
(74) *Attorney, Agent, or Firm* — Frank A. MacKenzie; Bejin Bieneman PLC

(57) ABSTRACT

A knee airbag includes a front panel, a rear panel and first and second tethers. The first tether is between the panels and defines an outboard chamber. The second tether is between the panels and defines an inboard chamber. The tethers cooperatively define a center chamber. The chambers, in an inflated position, are substantially vertical and parallel. The inboard chamber is thinner than the other chambers. In the inflated position, the tethers respectively define first and second knee-receiving pockets.

19 Claims, 6 Drawing Sheets

(56) References Cited

U.S. PATENT DOCUMENTS

| | | | | |
|---|---|---|---|---|
| 2011/0156378 A1* | 6/2011 | Matsushima | ......... | B60R 21/231 |
| | | | | 280/730.1 |
| 2011/0204603 A1* | 8/2011 | Fukawatase | .......... | B60R 21/206 |
| | | | | 280/730.1 |
| 2011/0260432 A1* | 10/2011 | Matsushima | ......... | B60R 21/201 |
| | | | | 280/730.2 |
| 2014/0049026 A1* | 2/2014 | Webber | ................ | B60R 21/206 |
| | | | | 280/730.1 |

* cited by examiner

KNEE AIRBAG WITH RECEIVING POCKETS

BACKGROUND

In a frontal crash of a vehicle, an occupant's knees and lower legs may contact an interior instrumental panel which may include a glove box on a passenger side of the vehicle. Knee airbags are used to reduce a risk of injury to the knees and lower legs of the occupants. Knee airbags may be tuned to manage and reduce the injuries in frontal collisions by reducing the femur load. It is desired to provide a knee airbag that reduces a potential rotation of a tibia of the lower leg of the occupant that may occur with an oblique impact collision and an associated asymmetric loading.

DETAILED DESCRIPTION

Figure 1:
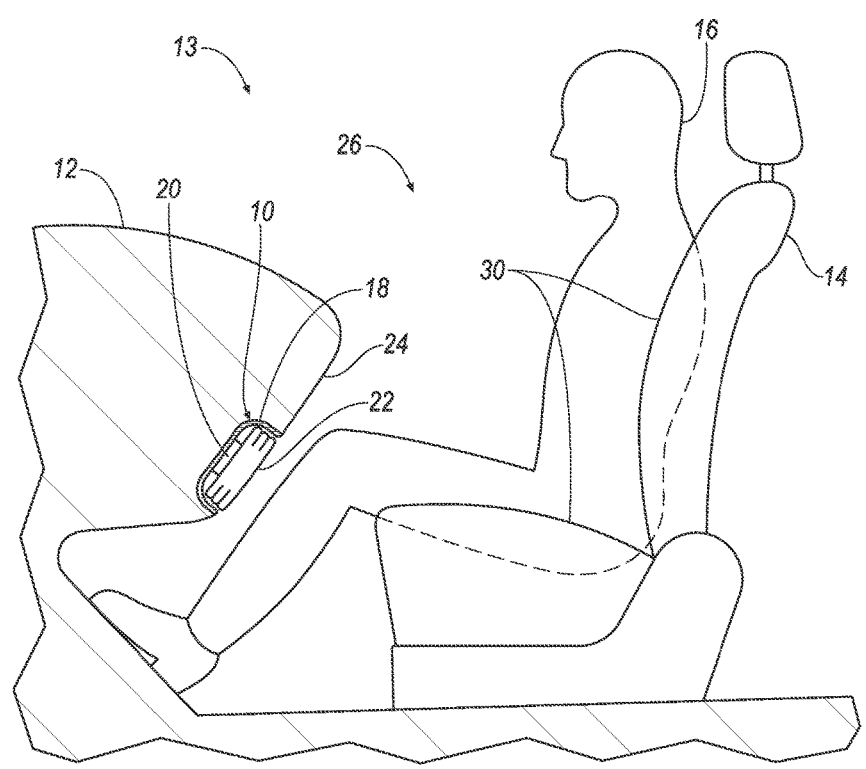
FIG. 1 is schematic side view of an occupant in a front seat with an example knee airbag module disposed in an instrument panel and an example knee airbag of the module in an undeployed position.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A knee airbag includes a front panel, a rear panel and first and second tethers. The first tether is between the panels and defines an outboard chamber. The second tether is between the panels and defines an inboard chamber. The tethers cooperatively define a center chamber. The chambers, in an inflated position, are substantially vertical and parallel. The inboard chamber is thinner than the other chambers. In the inflated position, the tethers respectively define first and second knee-receiving pockets.

The front panel and the rear panel may cooperatively define an outer perimeter of the airbag. The outboard chamber may be disposed between the first tether and an outboard side of the outer perimeter. The inboard chamber may be disposed between the second tether and an inboard side of the outer perimeter.

A knee airbag module includes a housing, an airbag and an inflator. The housing may be mounted to a downward-facing portion of a dashboard. The airbag, in an uninflated position, is disposed in the housing. In an inflated position, the airbag has three substantially parallel and vertically oriented and connected chambers. The chambers are separated by two tethers defining two pockets between the chambers. An inboard chamber is less thick than a center chamber. The inflator is coupled to the airbag and is fixed to the housing.

The airbag of the module may also include a front panel and a rear panel. The tethers may be disposed between the front panel and the rear panel. The panels may cooperatively define an outer perimeter of the airbag. One of the chambers may be an outboard chamber disposed between a first tether of the tethers and an outboard side of the outer perimeter. The inboard chamber may be disposed between a second tether of the tethers and an outboard side of the outer perimeter.

The inboard chamber may be narrower in a lateral direction than the center chamber and the outboard chamber are.

The center chamber may be wider in a lateral direction than each of the inboard chamber and the outboard chamber.

The inboard pocket may be substantially open on an inboard side.

The chambers may be of substantially a common length.

The first tether may extend between a top of the airbag and a bottom of the airbag and define a passage between the outboard chamber and the center chamber. The second tether may extend between the top of the airbag and the bottom of the airbag and define a passage between the center chamber and the inboard chamber.

The first tether is one of a first plurality of first tethers distributed along a first line between a top of the airbag and a bottom of the airbag. The first tethers may define passages between the outboard chamber and the center chamber. The second tether is one of a second plurality of second tethers distributed along a second line between a top of the airbag and a bottom of the airbag. The second tethers define passages between the inboard chamber and the center chamber.

In the inflated position, the chambers may each define a column extending from a top of the airbag to a bottom of the airbag.

In the inflated position, the tethers and the chambers may cooperatively define the pockets in the rear panel.

Figure 2:
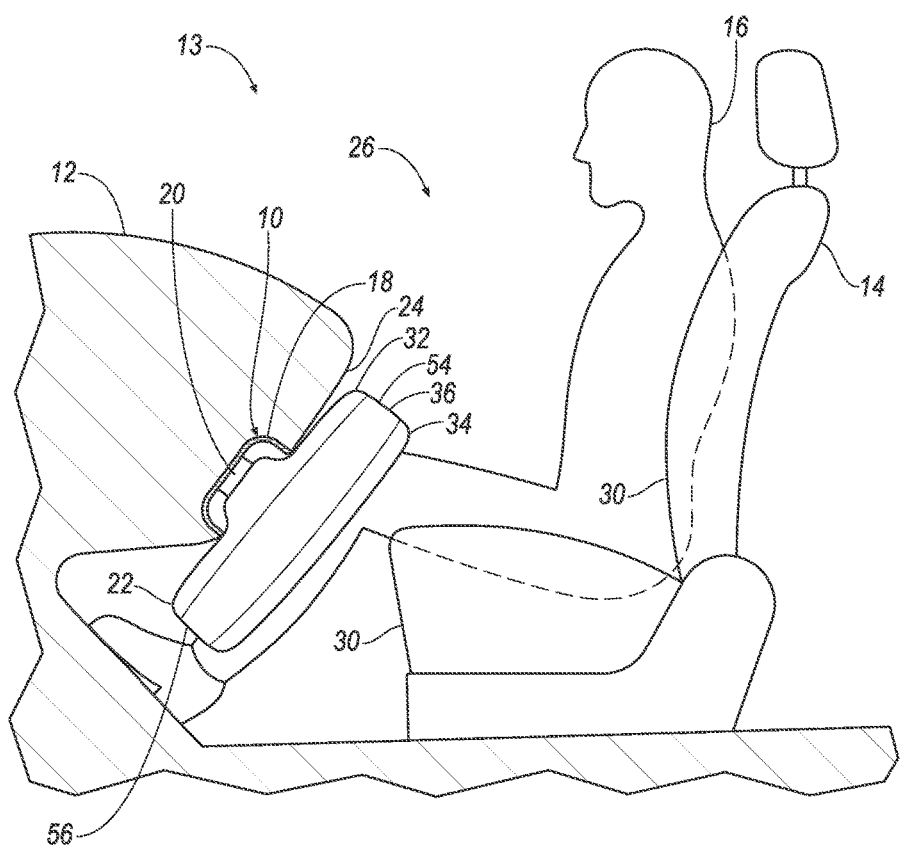
FIG. 2 is a schematic side view of the occupant and the airbag module of FIG. 1 with the knee airbag in a deployed position.

As illustrated in FIGS. 1 and 2, a knee airbag module 10 may disposed in a dashboard 12 of a vehicle 13, shown in part, in front of a seat 14 for occupation by an occupant 16. The airbag module 10 may include a housing 18, an inflator 20, and a knee airbag 22. A panel, not shown, may be disposed over the airbag 22. The inflator 20 and the airbag 22 may be disposed in the housing 18 in the undeployed, i.e., uninflated, position. The housing 18 provides a reaction surface for the airbag 22 in a deployed, i.e., inflated, position. The housing 18 may be supported by the dashboard 12. More particularly, the housing 18 may be mounted to a downward-facing lower portion 24 of the dashboard 12. The housing 18 may be formed of any material, e.g., a rigid polymer, a metal, a composite, etc.

The airbag 22 may be formed of a woven polymer or any other material. As one example, the airbag 22 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The dashboard 12 may be disposed at a forward end of a passenger cabin 26 of the vehicle 13 and face toward the front seats 14. The dashboard 12 may include an instrument panel with gauges and vehicle controls and may include a steering wheel (not shown).

The inflator 20 may be connected to the airbag 22. Upon receiving a signal from, e.g., a vehicle controller (not shown), the inflator 20 may inflate the airbag 22 with an inflatable medium, such as a gas. The inflator 20 may be, for example, a pyrotechnic inflator that uses a chemical reaction to drive inflation medium to the airbag 22. The inflator 20 may be of any suitable type, for example, a cold-gas inflator.

An impact sensor (not shown) may be in communication with the controller. The impact sensor may be programmed to detect an impact to the vehicle. The impact sensor may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor may be located at numerous points in or on the vehicle.

The example seat 14 shown in the figures is a bucket seat. Alternatively, the seat 14 may be a bench seat or another type of seat. The seat 14 may have seat cushions 30 that may be supported on a seat frame (not shown). The cushions 30 may be made of cushioning material covered with upholstery. The cushioning material may be formed of foam or any other suitable supportive material. The upholstery may be formed of cloth, leather, faux leather, or any other suitable material. The upholstery may be stitched in panels around the foam.

As illustrated in FIGS. 2-9, the airbag 22 may include a front panel 32 and a rear panel 34. A peripheral panel 36 may be disposed between the front panel 32 and the rear panel 34, or the front and rear panels 32, 34 may be directly connected to each other. The rear panel 34 may overlie the front panel 32. The front panel 32 and the rear panel 34 may cooperatively define an outer perimeter 38 of the airbag 22.

The airbag 22 includes three chambers, an outboard chamber 42, an inboard chamber 48, and a center chamber 52, that, in an inflated position, are substantially vertical and parallel. The inboard chamber 48 and the outboard chamber 42 are each connected to the center chamber 52. The chambers 42, 48 and 52 are in fluid communication with each other and are separated by an example first tether 40 and an example second tether 46. The first tether 40 is disposed between and connects the front and rear panels 32, 34. The first tether 40 defines the outboard chamber 42. The tether 40 may extend along a first line or lines 60. The first lines 60 extend between a top 54 and a bottom 56 of the airbag 22 in the inflated position. The outboard chamber 42 is disposed between the first tether 40 and an outboard side 44 of the airbag 22. The second tether 46 is disposed between and connects the front and rear panels 32, 34. The second tether 46 defines an inboard chamber 48. The tether 46 may extend along a second line or lines 61. The second lines 61 extend between the top 54 and the bottom 56 of the airbag 22 in the inflated position. The inboard chamber 48 is disposed between the second tether 46 and an inboard side 50 of the airbag 22. The tethers 40, 46 cooperatively define a center chamber 52. The chambers 42, 48, 52 in the inflated position, are substantially vertical and parallel to each other.

Fluid communication between the chambers 42, 48, 52 may be allowed by gaps G1 and G2 at an end or ends of each of tethers 40 and 46 relative to the bottom 56 and/or the top 54 of the airbag 22. Gaps G1 and G2 define passages allowing communication of the inflatable medium between the chambers 42, 48, 52.

Figure 8:
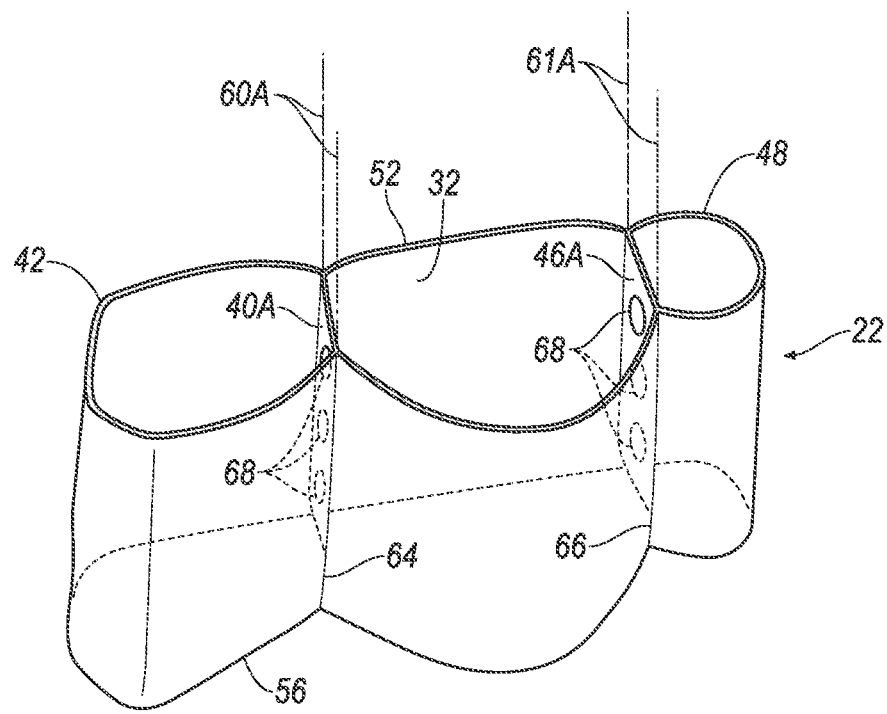
FIG. 8 is a perspective section view of the airbag of FIG. 5 in the direction of arrows 6, illustrating a first alternative tether configuration.

As illustrated in FIG. 8, an example alternative first tether 40A and an example alternative second tether 46A may include a plurality of apertures 68 to serve as passages in and through the tethers 40A, 46A to allow fluid communication of the inflatable medium between the chambers 42, 48, 52. The tethers 40A, 46A may respectively extend along lines 60A and 61A. The lines 60A, 61A extend between the top 54 and the bottom 56 of the airbag 22 in the inflated position.

Figure 9:
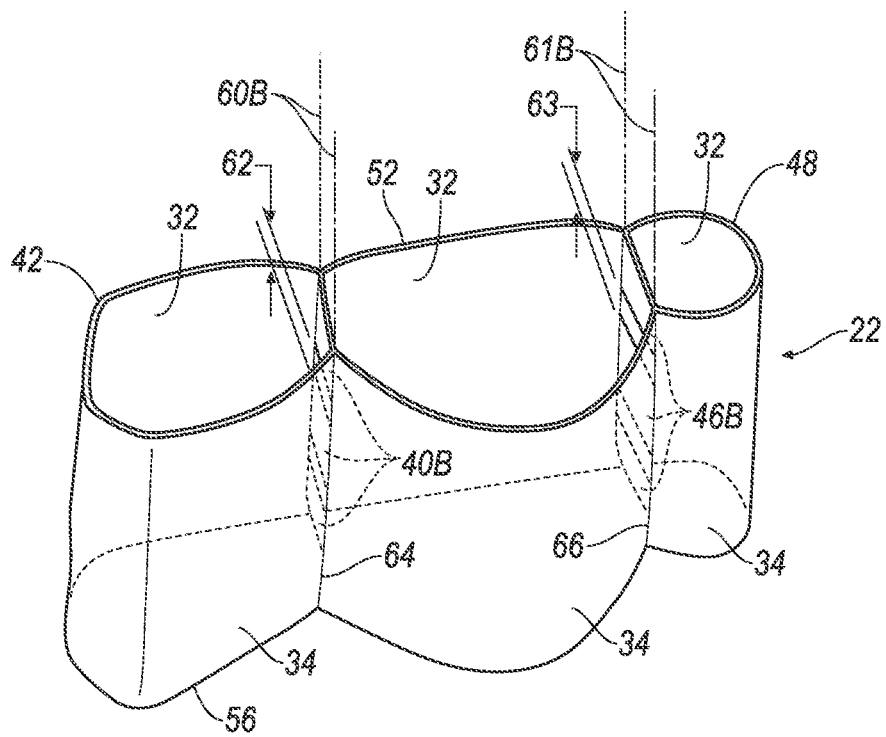
FIG. 9 is a perspective section view of the airbag of FIG. 5 in the direction of arrows 6, illustrating a second alternative tether configuration.

As illustrated in FIG. 9, an example second alternative first tether 40B may be one of a plurality of tethers 40B distributed along a first line or lines 60B between the top 54 of the airbag 22 and the bottom 56 of the airbag 22 in the inflated position. The first tethers 40B, by their relative spacing, may define passages 62 between the adjacent chambers 42 and 52. Similarly, an example alternative second tether 46B may be one of a second plurality of tethers 46B distributed along a second line or lines 61B between the top 54 of the airbag 22 and the bottom 56 of the airbag 22 in the inflated position. The second tethers 46B may define passages 63 between the adjacent chambers 52, 48.

In the inflated position of the airbag 22, the tethers 40, 46, together with the rear panel 34, define an outboard knee pocket 64, i.e., an outboard knee-receiving pocket, i.e., an outboard receiving pocket, on an outboard side of the center chamber 52 and an inboard knee pocket 66, i.e., an inboard knee-receiving pocket, i.e., an inboard receiving pocket, on an inboard side of the center chamber 52. Formation of the pockets 64, 66, may be allowed by providing the rear panel 34 with a greater lateral length of material between the outboard side 44 and the first tether 40, between the tethers 40, 46, and between the second tether 46 and the inboard side 50 than the corresponding lengths of material of the front panel.

The inboard chamber 48 is thinner than chambers 42 and 52. Chamber 48 has a thickness T1 in a fore-aft direction. Thickness T1 is less than a thickness T2 of the outboard chamber 42. Thickness T1 is also less than a thickness T3 of the center chamber 52. The chambers 42, 48, 52 may be of substantially a common length L1. The inflated chambers 42, 48, 52 define columns extending from the top 54 of the airbag 22 to the bottom 56 of the airbag 22.

Figure 3:
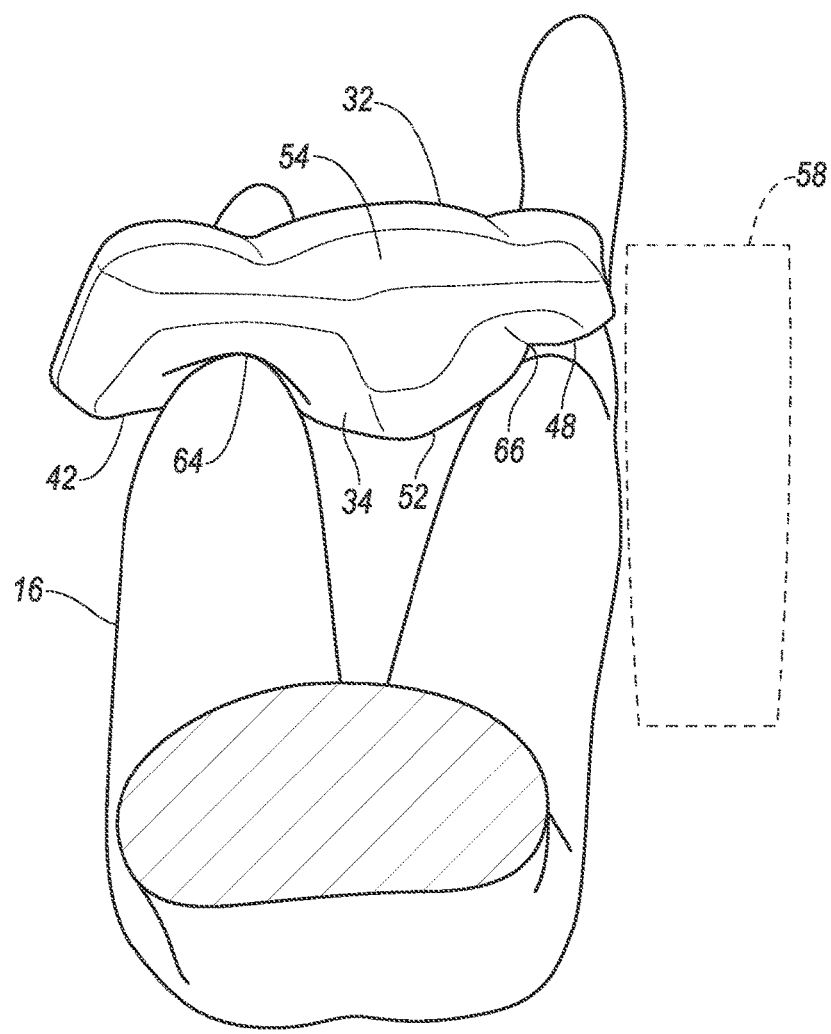
FIG. 3 is a top view of the occupant and airbag of FIG. 2 in the deployed position.
Figure 4:
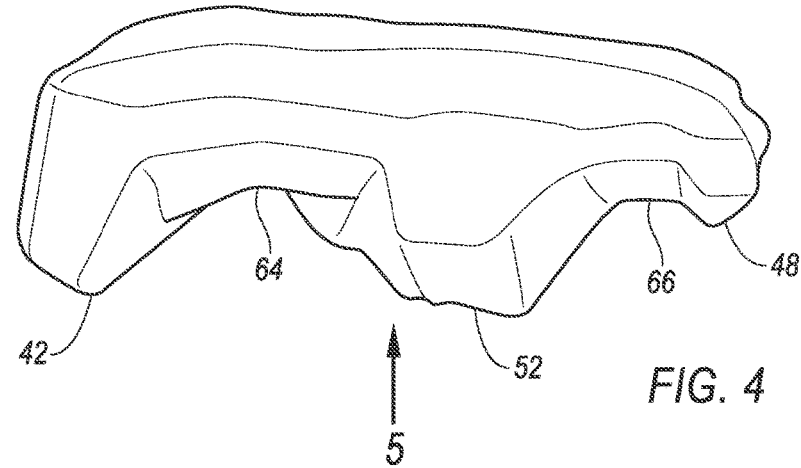
FIG. 4 is a top view of the example airbag of FIG. 3 in the deployed position.
Figure 5:
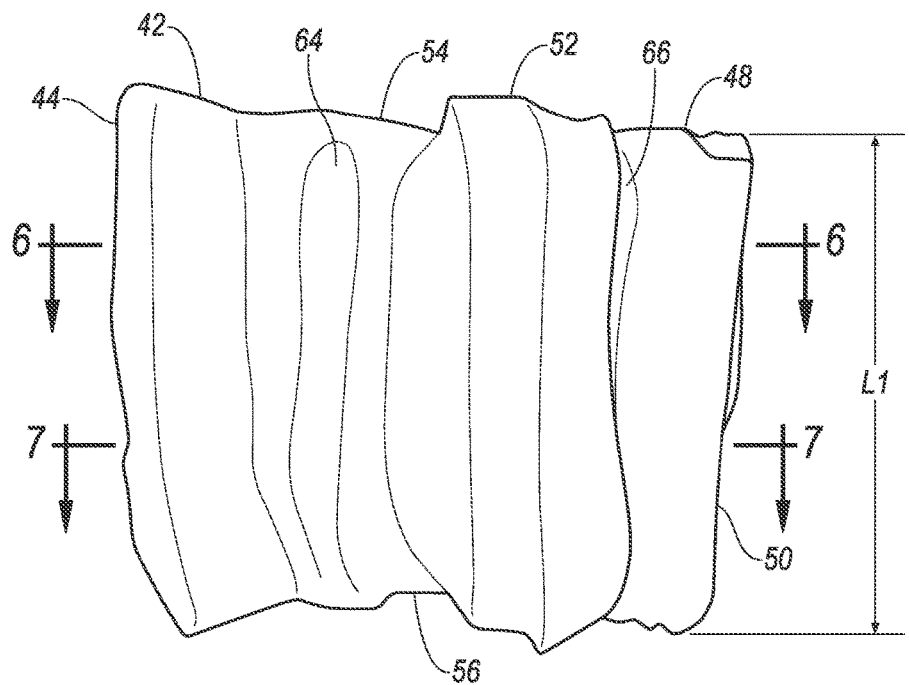
FIG. 5 is a view of the airbag of FIG. 4 in the direction of arrow 5.
Figure 6:
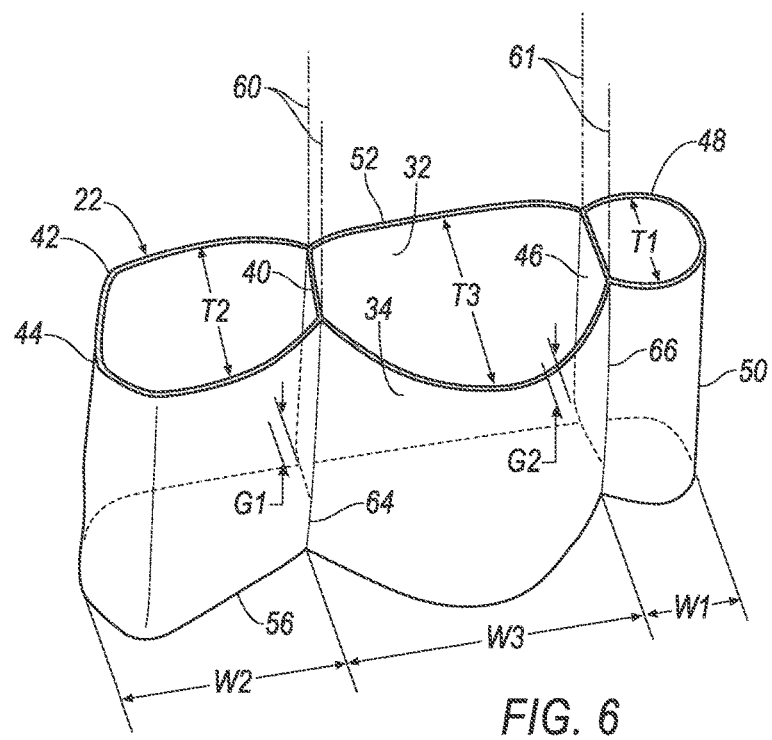
FIG. 6 is a perspective section view of the airbag of FIG. 5 in the direction of arrows 6.
Figure 7:
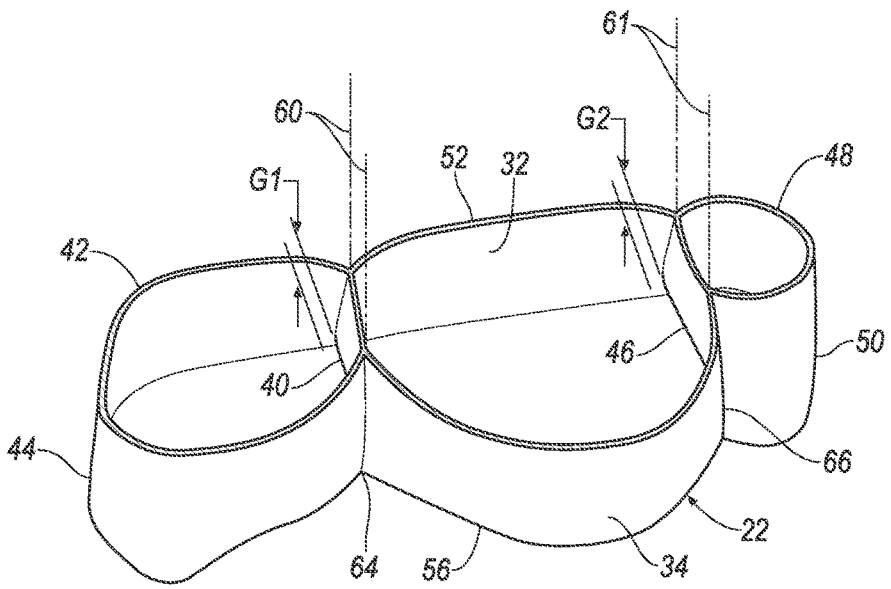
FIG. 7 is a perspective section view of the airbag of FIG. 5 in the direction of arrows 7.

The example inboard chamber 48 may be narrower, with a width W1, than widths W2 and W3 of the outboard chamber 42 and the center chamber 52 respectively. The width W3 of the example center chamber 52 may be wider in a lateral direction than the widths W1 and W2 of the inboard and outboard chambers 48, 42 respectively. The inboard chamber 48 may abut a center console 58 in the inflated position as shown in FIG. 3. The center console 58 may, cooperatively with the airbag 22, restrict forward inboard knee motion in an event of an opposite side impact, and the center chamber 52 may, cooperatively with the airbag 22, may control forward inboard knee motion in the event of a same-side impact.

The knee airbag module 10 may operate in the following manner.

In the event of an impact, including an offset impact and an oblique impact, the impact sensor may detect the impact and transmit a signal through the communications network to the vehicle controller. The vehicle controller may transmit a signal through a communications network to the inflator. The inflator 20 may discharge and inflate the knee airbag 22.

An example offset impact may have a 25% to 40% overlap of a side of the vehicle's front end with an obstacle. Such an impact will result in an inertial force of the occupant relative to the vehicle biasing the occupant 16 in both a forward direction toward the dashboard 12 and a lateral direction, with the lateral direction, depending on the side of the overlap, being outboard, as toward a door, or inboard, as toward the center console 58. A resultant loading on the occupant 16 will be asymmetric relative to a longitudinal vehicle axis, with one side of the occupant being biased relative to the dashboard. Similarly, an example oblique impact, in which the vehicle impacts a barrier or a vehicle at an example angle between 10 degrees and forty degrees to a longitudinal axis of the vehicle, will result in an inertial force of the occupant relative to the vehicle, biasing the occupant 16 in both a forward direction and in a lateral direction. An example impact may be both an offset impact and an oblique impact.

When the inertial force biases the occupant 16 forward and outboard, the knee pockets 64, 66 receive the associated knees, even the above-described asymmetric loading. The knees are separated by the center chamber 52, preventing the knees from contacting each other. The knee airbag 22 is sufficiently thick in its inflated position to prevent the knees and lower legs from coming into engagement with the lower portion 24 of the dashboard 12. The outboard chamber 42 prevents an outboard knee from engaging the outboard part of the cabin 26, e.g., the door.

When the inertial force biases the occupant 16 forward and inboard, the knee pockets 64, 66 receive the associated knees, and limit any lateral motion of the knees, and by association, the lower legs. The knees are separated by the center chamber 52, preventing the knees from contacting each other. The knee airbag 22 is sufficiently thick in its inflated position to prevent the knees and lower legs from coming into engagement with the lower portion 24 of the dashboard 12. The inboard chamber 48, cooperatively with the console 58, restrains and protects an inboard knee from impact injury As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A knee airbag comprising:
    a front panel;
    a rear panel;
    a first tether between the panels defining an outboard chamber; and
    a second tether between the panels defining an inboard chamber, the tethers cooperatively defining a center chamber and the chambers in an inflated position being substantially vertical and parallel, the inboard chamber being thinner than the other chambers,
    wherein in the inflated position the tethers respectively define outboard and inboard knee-receiving pockets.

2. The knee airbag of claim 1, wherein the front panel and the rear panel cooperatively define an outer perimeter of the airbag, and the outboard chamber is disposed between the first tether and an outboard side of the outer perimeter, and the inboard chamber is disposed between the second tether and an inboard side of the outer perimeter.

3. The knee airbag of claim 1, wherein the inboard chamber is narrower in a lateral direction than the center chamber and the outboard chamber are.

4. The knee airbag of claim 1, wherein the center chamber is wider in a lateral direction than each of the inboard chamber and the outboard chamber.

5. The knee airbag of claim 1, wherein the inboard pocket is substantially open on an inboard side.

6. The knee airbag of claim 1, wherein the chambers are of substantially a common length.

7. The knee airbag of claim 1, wherein the first tether extends between a top of the airbag and a bottom of the airbag and defines a passage between the outboard chamber and the center chamber and the second tether extends between the top of the airbag and the bottom of the airbag and defines a passage between the center chamber and the inboard chamber.

8. The knee airbag of claim 1, wherein the first tether is one of a first plurality of first tethers distributed along a first line between a top of the airbag and a bottom of the airbag and the first tethers define passages between the outboard chamber and the center chamber and the second tether is one of a second plurality of second tethers distributed along a second line between a top of the airbag and a bottom of the airbag and the second tethers define passages between the inboard chamber and the center chamber.

9. The knee airbag of claim 1, wherein in the inflated position, the chambers each define a column extending from a top of the airbag to a bottom of the airbag.

10. The knee airbag of claim 9, wherein in the inflated position, the tethers and the chambers cooperatively define the pockets in the rear panel.

11. A knee airbag module comprising:
    a housing for mounting to a downward-facing portion of a dashboard;
    an airbag in an uninflated position disposed in the housing and in an inflated position having three substantially parallel and vertically oriented and connected chambers separated by two tethers defining two pockets between the chambers with an inboard chamber being less thick than a center chamber; and
    an inflator coupled to the airbag and fixed to the housing;
    wherein the inboard chamber is less thick than the outboard chamber.

12. The knee airbag module of claim 11, wherein the center chamber is wider in a lateral direction than each of the inboard and outboard chambers.

13. The knee airbag module of claim 11, wherein an inboard pocket of the pockets is substantially open on an inboard side.

14. The knee airbag module of claim 11, wherein the chambers are of substantially a common length.

15. The knee airbag module of claim 11, wherein a first tether of the tethers extends between a top of the airbag and a bottom of the airbag and defines a passage between one of the chambers being an outboard chamber and the center chamber and a second tether of the tethers extends between the top of the airbag and the bottom of the airbag and defines a passage between the center chamber and the inboard chamber.

16. The knee airbag module of claim 11, wherein a first tether of the tethers is one of a first plurality of first tethers distributed along a first line between a top of the airbag and a bottom of the airbag and the first tethers define passages between the center chamber and one of the chambers being an inboard chamber and a second tether of the tethers is one of a second plurality of second tethers distributed along a second line between a top of the airbag and a bottom of the airbag and the second tethers define passages between the center chamber and the inboard chamber.

17. The knee airbag module of claim 11, the airbag further comprising:
   a front panel; and
   a rear panel,
   wherein the tethers are disposed between the front panel and the rear panel and the panels cooperatively define an outer perimeter of the airbag, and one of the chambers being an outboard chamber disposed between a first tether of the tethers and an outboard side of the outer perimeter, and the inboard chamber being disposed between a second tether of the tethers and an outboard side of the outer perimeter;
   wherein the inboard chamber is less thick than the outboard chamber.

18. The knee airbag module of claim 17, wherein in the inflated position, the chambers each define a column extending from a top of the airbag to a bottom of the airbag.

19. The knee airbag module of claim 18, wherein in the inflated position, the tethers and the chambers cooperatively define the pockets in the rear panel.

\* \* \* \* \*